UNITED STATES PATENT OFFICE.

JOHN F. TYRRELL, OF NEW YORK, N. Y.

COMPOUND FOR SOUP.

SPECIFICATION forming part of Letters Patent No. 233,716, dated October 26, 1880.

Application filed June 5, 1880. (No specimens.)

*To all whom it may concern:*

Be it known that I, JOHN F. TYRRELL, of New York city, have invented a new and useful Improvement in Compounds for the Preparation of Soup, of which the following is such a full, clear, and exact description of this my invention as will enable others to understand and practice the same.

The object of my invention is to provide a mixed compound of the solid portions of soup properly proportioned, so that by the addition of water or equivalent material in proper amount and boiling a good soup shall be produced, the solid ingredients being put up in suitable air-tight packages for transportation and storage, as a new article of manufacture.

In the manufacture or making of soup very many different ingredients are mixed together in various proportions, and boiled with water or other liquid, requiring considerable skill to make the proportions correct and the supply of a great many different ingredients at great inconvenience and annoyance. Soups are sometimes prepared, mixed, and packed in cans ready to boil and use. Such packages are heavy and occupy a large space, making them expensive to transport and store.

My improved compound for the preparation of soup consists of the several necessary ingredients, which are solid or nearly so. These are reduced to a dry state by evaporation of the moisture in them, and are then reduced to granules or powder and mixed with one another in such proportion as may be desired, and the thus-prepared compound is packed in air-tight cans or vessels ready for the market.

In the preparation of my compound the various ingredients are first prepared separately, ready to be mixed together and packed. For this I take beans, pease, carrots, okra, tomatoes, or other vegetables, and dry them quite thoroughly, and then grind or pulverize them, keeping each kind separate. I also take meat extracts or essence of meat, dry it, and reduce it to a pulverized condition.

Vermicelli and macaroni or similar articles may be added to my compound in either a powdered state or as made by the manufacturer.

The several ingredients having been properly dried and pulverized, they are next mixed together, and with the dry and pulverized seasoning or spices mixed in the proper proportion to form a compound for the preparation of soup, which is to be packed in suitable vessels or cans and sealed air-tight.

I prefer to mix the several ingredients prepared as above described in accordance with the following formula: six and one-quarter ounces pulverized barley, one ounce meat extract, one-half ounce celery salt, one-quarter ounce black pepper—eight ounces compound—which compound of the several ingredients, prepared as above set forth and mixed with three quarts of water and boiled for about fifteen minutes, will produce a good, palatable, and agreeable soup.

The proportion and ingredients may be varied slightly without departing from the nature of my invention.

The compound thus made and packed may be kept for a long time, is always ready for use, and by the addition of water and a few minutes' boiling produces a soup containing the many ingredients in their correct proportion, according to which the package was prepared, and this from one package.

What I claim as new, and desire to secure by Letters Patent of the United States, is—

As a new article of manufacture, a compound for the preparation of soup, composed of dried and granulated meat extracts, dried and granulated vegetables, and dry and granulated seasoning, in the proportions substantially as specified, put up in air-tight vessels or cans, the several ingredients being so proportioned as to form, when boiled with water or its equivalent in about the quantity hereinbefore set forth, an agreeable and palatable soup, as specified and set forth.

J. F. TYRRELL.

Witnesses:
DAN E. TUTHILL,
W. H. T. WINNE.